United States Patent [19]
Hurd

[11] 3,850,478
[45] Nov. 26, 1974

[54] ACCUMULATOR APPARATUS AND METHOD

[75] Inventor: Stanley E. Hurd, Sunnyvale, Calif.

[73] Assignee: The Hotch & Merriweather Machinery Company, Hayward, Calif.

[22] Filed: Feb. 22, 1973

[21] Appl. No.: 334,594

[52] U.S. Cl. ................................ 302/2 R, 302/31
[51] Int. Cl. ........................................ B65g 51/02
[58] Field of Search .................... 302/2 R, 29, 31

[56] References Cited
UNITED STATES PATENTS

| | | | |
|---|---|---|---|
| 2,342,680 | 2/1944 | Melzer | 302/2 R X |
| 3,105,720 | 10/1963 | Barker | 302/2 R |
| 3,129,978 | 4/1964 | Szatkowski | 302/2 R |
| 3,134,588 | 5/1964 | Zeutschel | 198/34 X |
| 3,384,287 | 5/1968 | Miller | 302/2 R X |
| 3,684,327 | 8/1972 | Hurd | 302/2 R |
| 3,743,359 | 7/1973 | Schonfeld et al. | 302/31 X |

Primary Examiner—Evon C. Blunk
Assistant Examiner—W. Scott Carson
Attorney, Agent, or Firm—Patrick J. Walsh

[57] ABSTRACT

An accumulator apparatus and method wherein articles are fed along an air conveyor with means to accumulate the articles, thereby evening out irregularities in production rates and feeds. The invention is illustrated and described with respect to aerosol valve assemblies for aerosol containers, but the invention is applicable to the feeding of many kinds of articles including those which may be difficult to handle individually. An air conveyor is used to feed the articles between lateral guide means, and wherein the guide means are perforated whereby the articles may be accumulated and still avoid the development of an excess amount of friction between the articles and the guide means which would prevent easy subsequent feeding of the articles on demand.

2 Claims, 6 Drawing Figures

ACCUMULATOR APPARATUS AND METHOD

This invention relates to a method of and apparatus for feeding articles and, more particularly, to an accumulator apparatus and method by which articles may be fed and accumulated when necessary.

Heretofore gravity fed chutes have been commonly employed to feed articles to an assembly station, filling station or other operating station of a machine. These chutes have been relatively short in order to operate satisfactorily and, consequently, do not permit a sufficient amount of accumulation of the articles. As a result, the assembly station, filling station or other downstream operating station of the machine cannot be fed smoothly and continuously so that the machine must be shut down and operated on an intermittent basis.

In the filling of aerosol containers in a plant, for example, it is customary to use an orienter device which is directly coupled to a filling machine which in turn fills the container and applies a valve assembly of irregular and hard-to-handle configuration. The orienter usually orients the assemblies from a bulk supply and inserts them into a short rod chute which feeds the filling machine. Orientation of the valve assemblies is very difficult and the mechanical means which are used are not reliable and frequently become jammed. When this happens, the short accumulation in the rod chute supplying the filling machine is depleted quickly and the filling machine must be shut down.

In the practice of the present invention, an air conveyor is used to transport the articles to a filling station. The air conveyor is provided with unique perforated guide means which permits the conveyor propelling fluid to escape thereby avoiding the development of a sufficient amount of friction between the articles and the guide means which would cause binding and prevent easy feeding of the articles.

In actual practice and with the use of an air conveyor having the capability of accumulating articles, the orienting device may be placed remotely with respect to the filling station and a large accumulation of valve assemblies can be maintained in the air conveyor to supply the filling machine in the event of a jammed condition in the orienter. With a large enough accumulation, the filling machine can generally maintain its operation while any jam in the orienter is being eliminated.

The inherent advantages and improvements of the present invention will become more readily apparent upon considering the following detailed description of the invention and by reference to the drawings in which.

Figure 1:
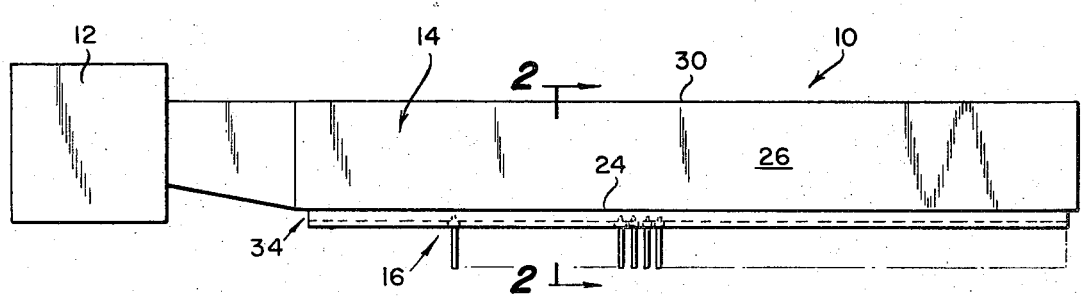
FIG. 1 is a side elevational view of the apparatus utilizing the accumulator apparatus of the present invention.

Referring now to FIG. 1 of the drawings, there is illustrated an air conveyor, indicated generally at 10, which is supplied with air from a suitable fan or blower member 12. The fan or blower member 12 is suitably interconnected to a plenum chamber means, indicated generally at 14, which directs air at articles 16 such as valve assemblies for aerosol containers in order to propel the articles in a manner to be more fully described hereinafter.

Figure 2:
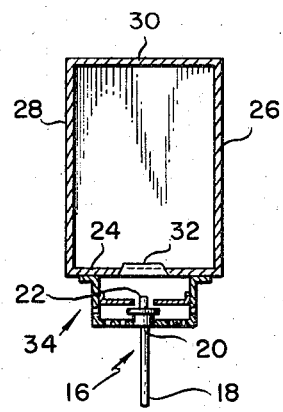
FIG. 2 is an elevational view taken in vertical cross section along line 2—2 of FIG. 1.
Figure 3:
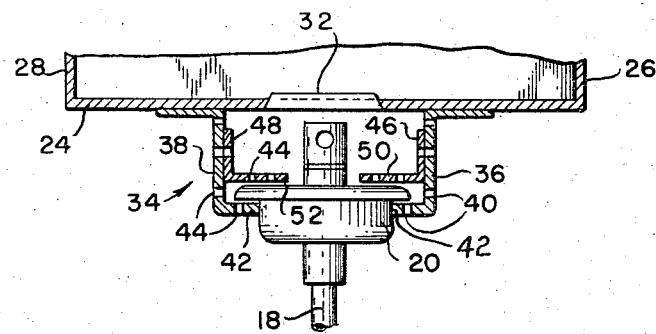
FIG. 3 is a fragmentary elevational view, drawn to an enlarged scale, of a portion of FIG. 2.

Reference to FIGS. 2 and 3 illustrate that the valve assemblies 16 commonly comprise a stem or dip tube portion 18 depending from a cup or hat section 20 which has mounted therein a valve device surmounted by a valve actuator member 22. The peripheral flange of the cup member 20 will be seated within and secured to a container body in usual manner at a downstream station.

Reference to these same figures illustrate the plenum chamber 14 in more detail. Thus plenum chamber 14 is shown to have a bottom wall 24, a front wall 26, a rear wall 28 and a top wall 30. A guide 34 for the articles 16 to be conveyed is disposed beneath plenum chamber 14.

Figure 6:
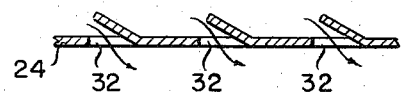

As seen in FIG. 6 along with FIGS. 2 and 3, air or other propelling fluid is expelled under pressure through a series of slots 32 in bottom wall 24 of the plenum chamber 14 in order to be directed at an angle to the relatively lightweight articles 16 and thereby propel them in the general direction of the arrows in FIG. 6.

In order to make it possible for the articles 16 to be satisfactorily accumulated along horizontal runs of the supporting guide means 34, the guide means must be made from a porous or perforated material. To this end, the supporting guide means 34 includes with front and rear vertically extending wall portions 36, 38 suitably supported by or attached to the underside of the bottom wall 24 of plenum chamber 14. The vertically extending wall portions 36, 38 are provided with inwardly extending flange means 42, 42 and provide support for the articles 16 being conveyed. The spacing between the confronting edges of wall flanges 42, 42 is slightly greater than the body of valve cup 20 and the brim of the cup 20 normally rests upon the inturned wall flanges.

In order to dissipate the fluid from the plenum chamber 14 which passes through the slot 32 and which is directed at article 16, the front and rear vertically extending wall portions 36, 38 as well as the inwardly extending flange means 42, 42 are provided with holes or apertures 40 and 44. The supporting guide means 34 is also shown to include front and rear top guide members 46 and 48 internally thereof and suitably attached to the vertically extending front and rear wall portions 36 and 38 with these top guide members also provided with inwardly extending flange means at 50 and 52. Once again the top guide members 46 and 48 as well as their inwardly extending flange portions 50 and 52 are perforated as at 44.

Figure 4:
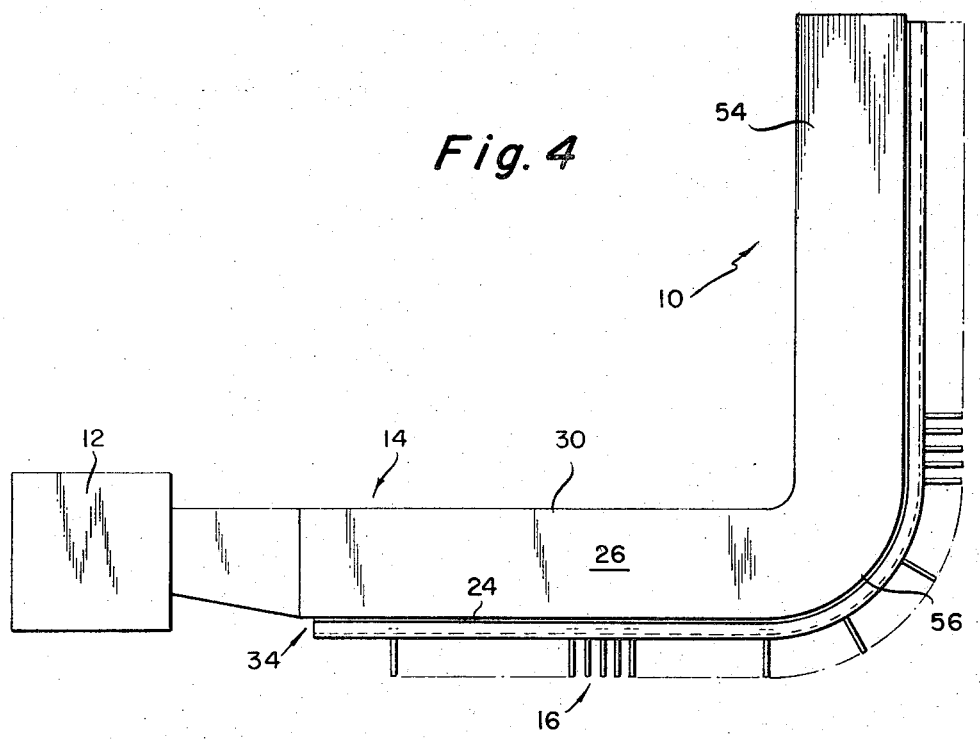
FIG. 4 is an elevational view of another installation which utilizes the accumulator apparatus of the present invention.
Figure 5:
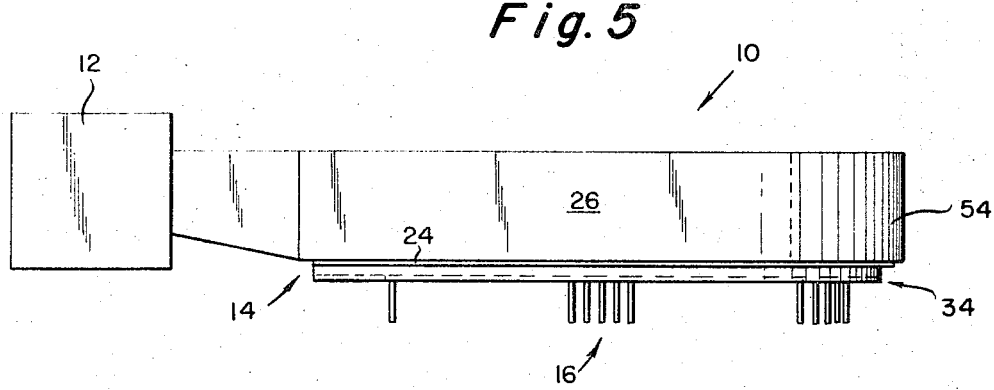
FIG. 5 is an elevational view of still another installation which utilizes the accumulator apparatus of the present invention; and, FIG. 6 is a fragmentary elevational view, drawn to an enlarged scale, illustrating the fluid paths from the bottom of a portion of the plenum chamber in FIG. 1.

Reference to FIGS. 4 and 5 illustrate two other installations for the accumulator apparatus of the present invention. In FIG. 4, the plenum chamber 14 is shown to be provided with a vertically extending portion 54 and in FIG. 5 the plenum chamber 14 is provided with a curved or corner portion 56. These additional illustrations merely serve to illustrate the wide variety of uses and the environment in which the present invention is applicable.

It has been found that the articles such as are shown at 16 in the drawings accumulate along the horizontal run of the plenum chamber 14. While the articles 16 may be satisfactorily transported by the air conveyor 10 along vertical sections such as is illustrated at 54, FIG. 4, as well as the horizontal sections, the accumulation occurs only along the horizontal runs or sections and not along the vertical runs.

In the practice of the present invention, the supporting drive means 34 must be constructed from a perforated material which permits the air or other propelling fluid to escape when there is an accumulation of valve assemblies on the air conveyor. If the guides were made of a solid material, the air would be trapped between the conveyor surface and the assemblies would exert pressure on the assemblies which in turn would rub excessively on the guides. This rubbing produces a retarding friction which prevents reinitiation of article conveyance as the downstream apparatus utilizes the articles fed thereto.

The invention has been described and illustrated with respect to the use of air as a propelling fluid but other fluids may be used where the need for a different fluid exists. For a more detailed disclosure of the air conveyor means per se, reference is made to the copending application entitled "Air Conveyor" and identified by Ser. No. 106,056 filed Jan. 13, 1971, and owned by a common assignee now abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which some within the meaning and range of equivalency of the claims are therefore intended to be embraced therein.

What is claimed and desired to be secured by United States Letters Patent is:

1. An apparatus for conveying and accumulating articles comprising a perforated deck plate having a plurality of slots arranged along said deck plate for issuing air jets having a flow component extending along the deck plate, a plenum chamber on one side of said deck plate for supplying air under pressure through said slots, means for supplying air under pressure to said plenum chamber, a member mounted on the other side of said deck plate in confronting relationship to said plurality of slots for supporting and guiding articles handled by said apparatus, said supporting and guiding member comprising a pair of spaced wall portions extending outwardly from said deck plate and having inwardly extending spaced flange means for receiving and supporting an article in operative relationship to air jets issued through said slots, a pair of top guide members mounted on said wall portions and having inwardly extending spaced flange means for overlying guiding said articles being handled, and perforations in said flange means and said top guide members of said supporting and guiding member for dissipating air issued through said slots.

2. An accumulator apparatus according to claim 1 wherein said supporting and guiding member includes portions of horizontal runs and portions of vertical runs and said articles are accumulated only on said horizontal runs.

* * * * *